United States Patent [19]

Rogers

[11] 4,194,306
[45] Mar. 25, 1980

[54] PLANETARIUM EDUCATIONAL DEVICE

[76] Inventor: Scott A. Rogers, 6510 Patterson Ave., Richmond, Va. 23226

[21] Appl. No.: 883,289

[22] Filed: Mar. 3, 1978

Related U.S. Application Data

[63] Continuation-in-part of Ser. No. 772,229, Feb. 25, 1977, abandoned.

[51] Int. Cl.$^2$ .............................................. G09B 27/00
[52] U.S. Cl. ...................................................... 35/44
[58] Field of Search ............................ 35/44, 43, 42.5

[56] References Cited

U.S. PATENT DOCUMENTS

| | | | |
|---|---|---|---|
| 554,101 | 2/1896 | Yaggy | 35/44 |
| 554,809 | 2/1896 | Yaggy | 35/44 |
| 624,614 | 5/1899 | Bevington | 35/44 |
| 635,268 | 10/1899 | Osse | 35/44 X |
| 647,204 | 4/1900 | Smith | 35/43 |
| 776,297 | 11/1904 | Cordeiro | 35/44 |
| 791,709 | 6/1905 | Meili | 35/44 |
| 1,223,128 | 4/1917 | Wallace | 35/44 |
| 1,419,604 | 6/1922 | Beckley | 35/44 X |
| 2,525,895 | 10/1950 | Graves | 35/44 |
| 2,587,615 | 3/1952 | Grega | 35/44 X |

*Primary Examiner*—William H. Grieb
*Attorney, Agent, or Firm*—Cushman, Darby & Cushman

[57] ABSTRACT

A planetarium educational device which illustrates the relative positioning and movement of the earth, moon, sun and other celestial objects in the solar system. The device also provides an illustrative means for depicting the changes in the ocean tides with respect to time, the time changes of selected points on the earth as the earth cycles through a day as well as a means for visually determining the portion of the earth in each day and for measuring of the elevational position of celestial objects above the horizon, azimuths and for generally teaching various aspects of celestial navigation.

18 Claims, 10 Drawing Figures

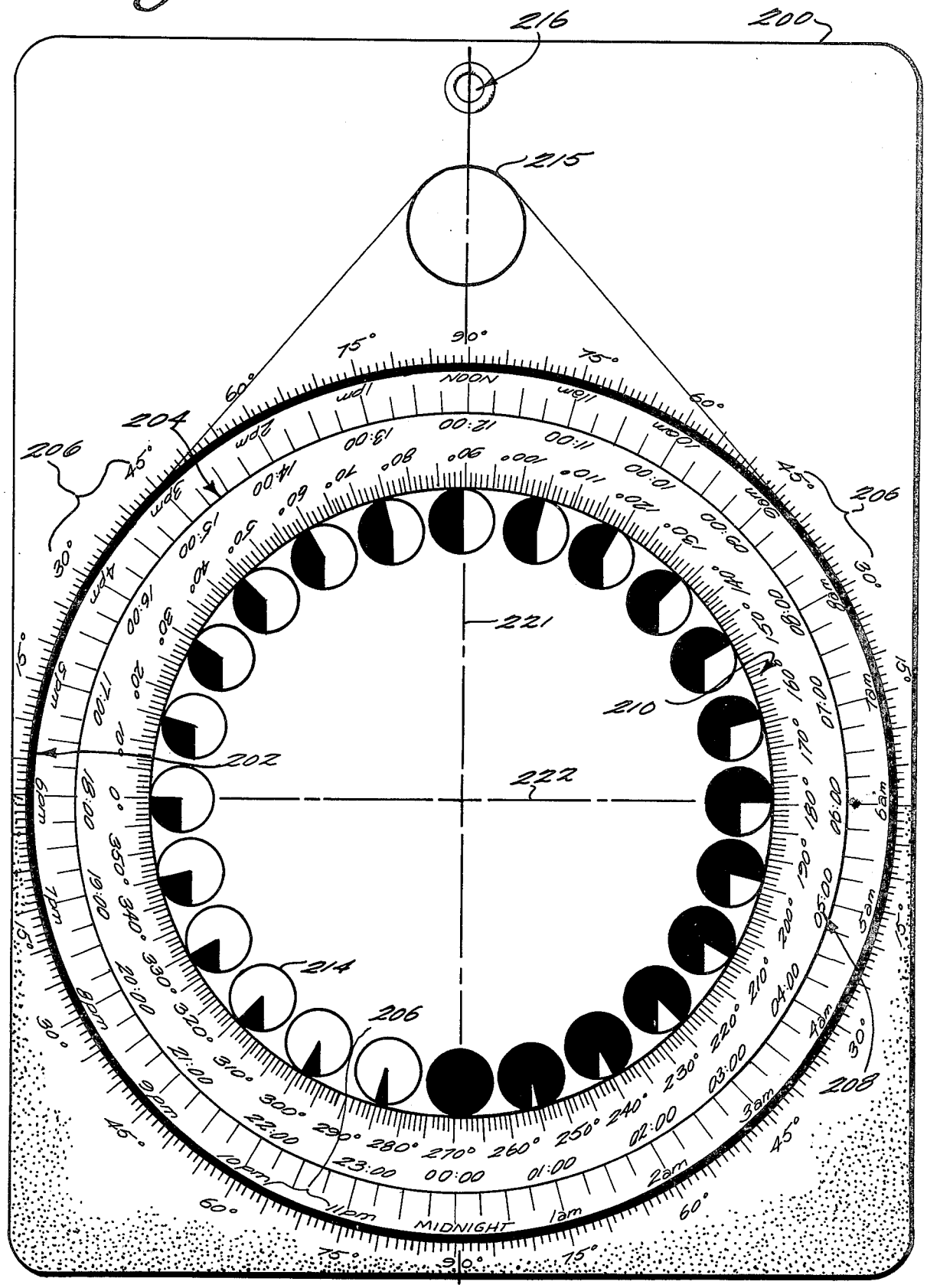

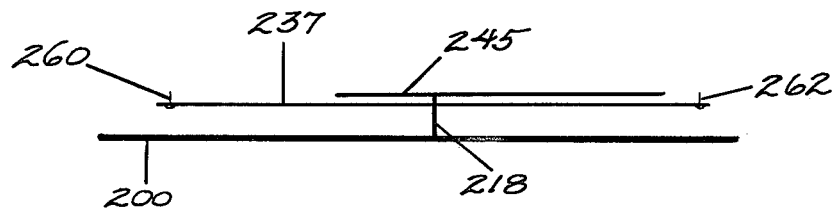
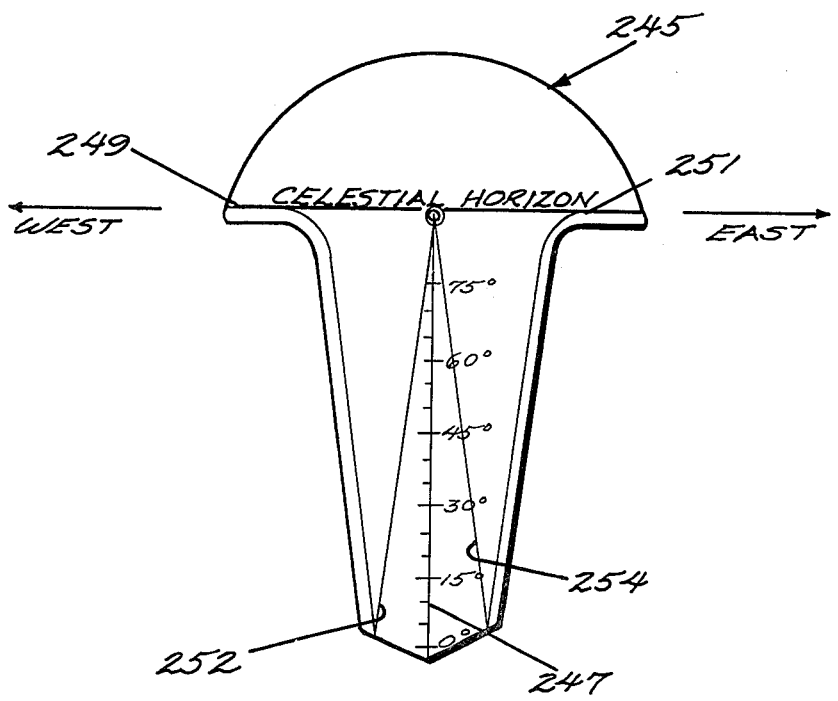

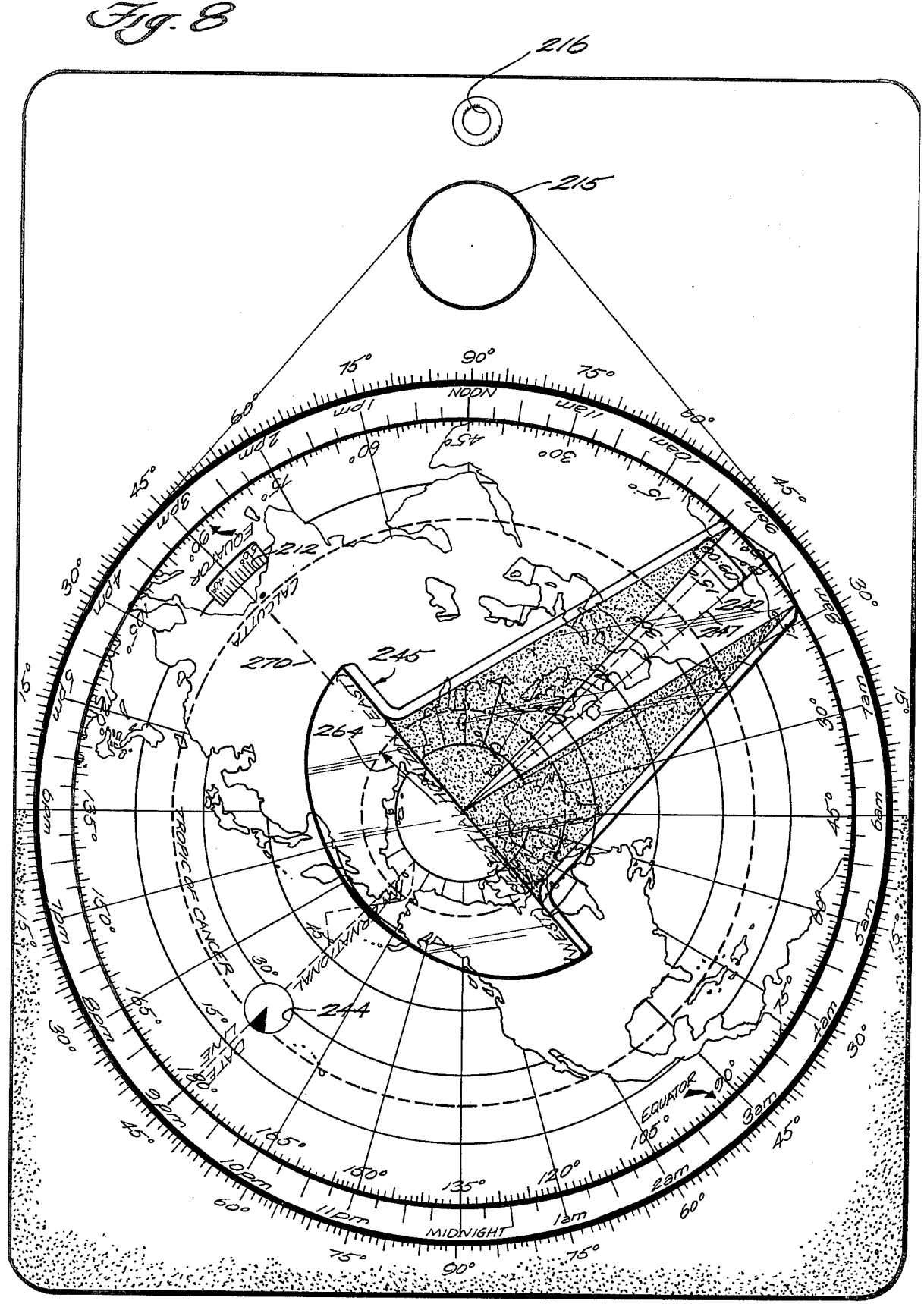

PLANETARIUM EDUCATIONAL DEVICE

BACKGROUND OF THE INVENTION

This is a Continuation-In-Part application of my application Ser. No. 772,229 filed Feb. 25, 1977, now abandoned.

This invention relates to an educational device in the form of a planetarium for illustrating time and motion in the solar system as well as the relationship between the celestial objects, such as the sun, and the horizon.

The teaching of concepts of time and motion in the solar system and the understanding of such concepts by youngsters is often very difficult. Psychologically, it is easier to comprehend the solar system geocentrically having the earth at the center thereof with the sun and moon revolving thereabout. Also, it is easier to teach children about the solar system as well as navigational principles if the relative position between the earth and other celestial objects can be manipulated by the student relative to the horizon or places in the hemisphere. In addition, the present invention allows students to determine or make use of the elevational characteristics of celestial objects, measure azimuths, and see how declination scales are useful in locating celestial objects.

Accordingly, the primary object of this invention is to provide a simplified, compact educational device for illustrating relative movement of the sun, moon and earth, concepts of time involving the earth's rotation with respect to the sun and for making measurements and determining facts relating to the position of celestial bodies above or below the horizon.

SHORT STATEMENT OF THE INVENTION

One embodiment of this invention is a planetarium educational device comprising a planar support having a generally circular disc-shaped portion representing the sun secured thereto and extending away therefrom. Rotatably positioned on the support plate is an elliptically-shaped disc having at one end thereof in line with the major axis thereof a rotatable disc which corresponds to the moon. The elliptical member represents the ocean tides with the representation of the high tides being along the major axis and the representation of the low tides being along the minor axis. Rotatably positioned over the elliptical disc member is a rotatable circular disc which rotates with respect to both the base support plate and the elliptical member. The circular disc has a map of substantially one half the surface area of the earth on the surface thereon with a plurality of longitudinal lines, including the Prime Meridian and a representation of the International Date Line formed thereon. Preferably, a time scale is fixed with respect to the base support plate and rotatable with respect to the elliptical disc and the circular disc to give an indication of the time of day as the circular disc representing the earth rotates with respect to the base support plate.

In operation, a relative rotation of the circular disc which corresponds to the earth with respect to the elliptical plate, which defines the position of the moon, and the base support plate, which defines the position of the sun, gives an indication of the time of day at any given place on the earth as well as provides a general indication of when any particular location on earth can expect a high or low tide. In addition, relative rotation of the elliptical disc with respect to the base support plate provides an indication of how and why the time at which high and low tides occur change depend upon the time in the lunar or synodic month. Further, such rotation also illustrates why there exists a full, quarter and new moon at different times in the lunar month.

Another embodiment of the invention principally includes a primary board or planar support having a representation of the sun thereon. A secondary board dimensionally smaller than the primary board is rotatably attached to the primary board and spaced from the sun. This secondary board can comprise a circular disc bearing a map of the northern or southern hemisphere including a plurality of latitude and longitude lines, the latter including the Prime Meridian and the International Date Line. A time scale is fixed to the primary board about the periphery of the circular disc providing an indication of the time of day as the circular disc rotates on the base or primary support plate. A plurality of indicia, including azimuth and time scales and a depiction of the days existing in the world, are provided on the primary board and are visible through openings positioned at particular positions on the secondary board. Use of these two boards provides a quick simple method of plotting the location of celestial objects, taking azimuths, determining the elevation of celestial objects, teaching basic navigational principles and worldwide time. A cursor can be rotatably mounted on the circular disc and provides an easy way of locating time zones, the celestial horizon and latitudes.

BRIEF DESCRIPTION OF THE DRAWINGS

The present invention will be more fully understood from the following detailed description of the preferred embodiment, the appended claims and the accompanying drawings in which:

FIG. 6 is a top plan view of the primary board or bottom layer of the embodiment shown in FIG. 5;

FIG. 7 is a side elevational view of the embodiment shown in FIG. 5;

FIG. 8 is a top plan view of the embodiment shown in FIG. 5 showing one particular exemplary mode of operation.

FIG. 10 is a top plan view of the cursor used within the embodiment shown in FIG. 5.

DETAILED DESCRIPTION OF THE PREFERRED EMBODIMENT

Figure 1:
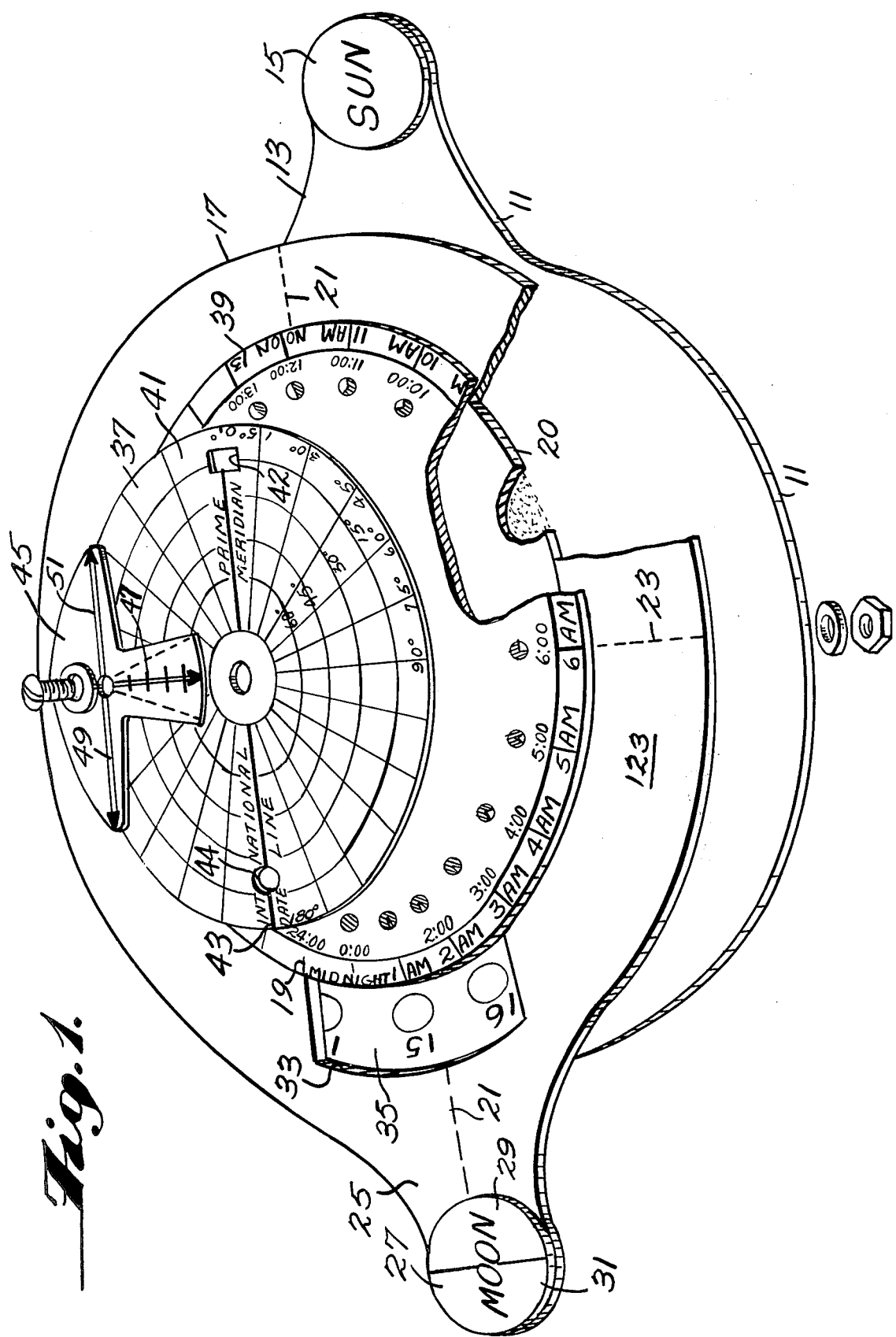
FIG. 1 is an exploded perspective view of the planetarium educational device of the present invention.

Refer now to FIG. 1 where there is illustrated an exploded perspective view of the preferred embodiment of the present invention. A planar support plate 11 is formed of a suitable stiff material, such as plastic, cardboard or a metallic material. The base plate 11 has an appendage 13 extending away therefrom terminating in a circular portion 15 which is raised with respect to the support plate 11. The circular raised portion 15 depicts the sun. In an alternate embodiment of the invention, the portion 15 is not raised but rather is simply colored yellow to depict the sun. An elliptical planar disc 17 is positioned on top of the support plate 11 and is rotatable with respect thereto. The elliptical disc 17 has a circular opening 19 at the center thereof. The elliptical disc 17 has a major axis 21 and a minor axis 23 with the major axis 21 representing the high tide and the minor axis 23 representing the low tide. Preferably, the disc 17 is colored blue to represent the color of the ocean. At one end of the disc 17 in line with the major axis thereof is an extended portion 25. A circular disc 27 which corresponds to the moon is rotatably fixed to the extended portion 25 by means of a rivet, pin or other suitable connecting means. The circular disc 27 which corresponds to the moon is preferably colored white over one half the surface area 29 thereof and dark over the other half of the surface area 31 thereof. As illustrated, the white portion 29 faces the sun 15 and serves to illustrate the reflection of sunlight toward the earth.

As is well known, the moon goes through a number of phases in each lunar (synodic) month, e.g., a full moon, new moon, quarter moon, etc. To illustrate this, an opening 33 is formed about a portion of the inner periphery of the elliptical disc 17 to permit viewing of a moon scale plate 35 which is fixedly secured to the base support plate 11. Thus, with the sun and moon in the positions illustrated, a full moon condition exists which occurs approximately fifteen days into the lunar month (assuming that the lunar month begins when the sun and moon are aligned with one another on the same side of the earth at which time a new moon exists). As will be seen hereinbelow, as the plate 17 rotates with respect to the plate 11, the surface area of the moon which reflects light back to the earth gradually decreases until the moon is in alignment with the sun on the same side of the earth. At this time, substantially no light is reflected from the sun to the earth. Thereafter, as the plate 17 continues to rotate in a counterclockwise direction with respect to plate 11, increasingly more surface area of the moon reflects light back to the earth until the full moon condition is again reached. This is illustrated visually by means of the moon scale plate 35 as viewed through the opening 33 and in addition can be seen by inspecting the position of the moon 27 and in particular the light side 29 thereof with respect to both the sun 15 and a disc 37 which corresponds to the earth.

Positioned over the elliptical disc 17 is a circular time plate 39 which has a time scale which is broken down into 15° time sectors, each of which represents one hour. In addition, positioned inside the opening 19 in the disc 17 is a circular support plate 20 having an outside diameter substantially the same as the diameter of the circular opening 19. Thus, this circular support member serves as an axle about which the elliptical disc 17 rotates. The time plate 39 has an outside diameter which is greater than the diameter of the opening 19 in the disc 17 and, accordingly, serves to maintain the disc 17 secured adjacent to the base support plate 11. The time plate 39 is fixedly secured to the base plate 11 and hence does not rotate with respect thereto. However, the circular disc 17 does rotate with respect to the time plate 39. As illustrated, the time plate 39 designates each hour of the day. For example, 12:00 P.M., i.e., noon, always is aligned next to the sun while 12:00 A.M., i.e., midnight, faces away from the sun. 6:00 A.M., which at the lower latitudes corresponds to daybreak, and 6:00 P.M., which at the lower latitudes corresponds to the end of daylight, are positioned at 90° with respect to a line extending from the sun to the center of the device.

Rotatably positioned over the time plate 39 is a circular disc 37 which corresponds to the earth. The disc 37 has formed thereon a map which depicts either the northern or southern hemisphere. Assuming that the northern hemisphere is illustrated on the surface of the disc 37, a plurality of meridian lines are drawn thereon at 15° intervals with the first meridian, i.e. the Prime Meridian, being illustrated by the numeral 41. As illustrated a rectangular aperture 42 is formed through the disc 37 on the Prime Meridian and is designated the GMT (Greenwich Meridian Time) window.

180° around the map from the Prime Meridian is the International Date Line 43 which, for the sake of simplicity, is illustrated as a straight line. A circular aperture 44 is formed through the disc 37 on the International Date Line and is designated the IDL (International Date Line) window. Positioned about the periphery of plate 39 are the Greenwich Meridian times. It should be noted that an hour difference in time exists between each 15° sector of the plate 37. This conforms to the time zones of the earth. Also positioned about the periphery of the plate 39 are a succession of circles which are divided into light and dark portions representing respectively the new and old day partially darkened to represent the position of the earth which has been swept into the new day by the International Date Line. Thus, when the International Date Line is positioned at 12:00 A.M., i.e., midnight, the circle is completely dark, indicating the entire earth is momentarily in the same day. Then as the International Date Line, rotating with the earth and with respect to the sun, rotates further a progressively larger light sector is generated to represent that portion of the earth which has entered the new day. The circular IDL window is aligned with the circles on the plate 39 and the rectangular GMT window is aligned with the times on the plate 39. Thus, as plate 37 representing the earth rotates, the IDL window will show what portions of the day have been swept in by the International Date Line. In addition, the GMT window will show what the Greenwich Meridian time is. In the position illustrated, the International Date Line is generally aligned with 12:00 A.M. on the time plate 39 and hence is diametrically opposite the sun 15. At this point, as the plate 37 is rotated counterclockwise, the International Date Line sweeps in a new day. Thus, as the plate 37 and the map thereon is rotated until the International Date Line aligns with 6:00 A.M., ¼ of the earth will be in a new day and ¾ of the earth will be in the old day. As the map on the disc 37 is rotated further in a counterclockwise direction, the International Date Line sweeps in a new day for an increasing portion of the earth until the International Date Line has been rotated 360° back to 12:00 A.M., at which time the International Date Line will start to sweep in another new day. Further, at any particular position of the map on disc 37, the time of day at a number of points on earth can be easily seen. As an example, it is readily apparent that those portions of the earth which are in direct alignment with the sun along the major axis 21 are at 12:00 P.M., while those portions of the earth which are displaced from the major axis 21 are at various times dependent upon their position with respect to the sun and with respect to time zone conventions established by international agreement. It therefore can be appreciated that the simplified educational device of the present invention provides an easy means for understanding time and motion concepts relative to the movement of the earth in the solar system.

Positioned over the circular disc 37 is a transparency 45 which is rotatable with respect to each of the aforementioned disc and planar surfaces. This transparency has a local meridian line 47, a western celestial horizontal line 49 and an eastern celestial horizontal line 51 formed thereon. The western and eastern horizontal lines are orthogonal with respect to the local meridian. By rotating line 47 to the meridian of a point of interest on the map of disc 37, the horizontal lines to the west and east can be easily seen. The transparency plate 45 is useful to illustrate, for example, the meaning of daylight savings time vis-a-vis standard time. For example, if the local meridian line 47 is positioned on the 75° meridian west which corresponds approximately to the position of Washington, D.C., one can tell what the time would be at any given instance under daylight savings time by moving the local meridian 15° to the east. Thus, when the 75° meridian west is aligned with 6:00 A.M. on the time plate 39 which corresponds to daybreak, the time of day in standard time is 6:00 A.M. However, if daylight savings time exists, a simple viewing of the position of the local meridian 47 will indicate that the time of day of daybreak is really 7:00 A.M.

Each of the disc and support plates 11, 17, 37 and 45 are rotatable with respect to one another and are secured to each other by a suitable means, such as, for example, the nut and bolt arrangement illustrated or a rivet, pin or other suitable means known in the art. It should be understood that the materials utilized to form the educational device may be cardboard, plastic, metallic or other suitable materials which provide relatively stiff plates which are not readily worn out.

Figure 2:
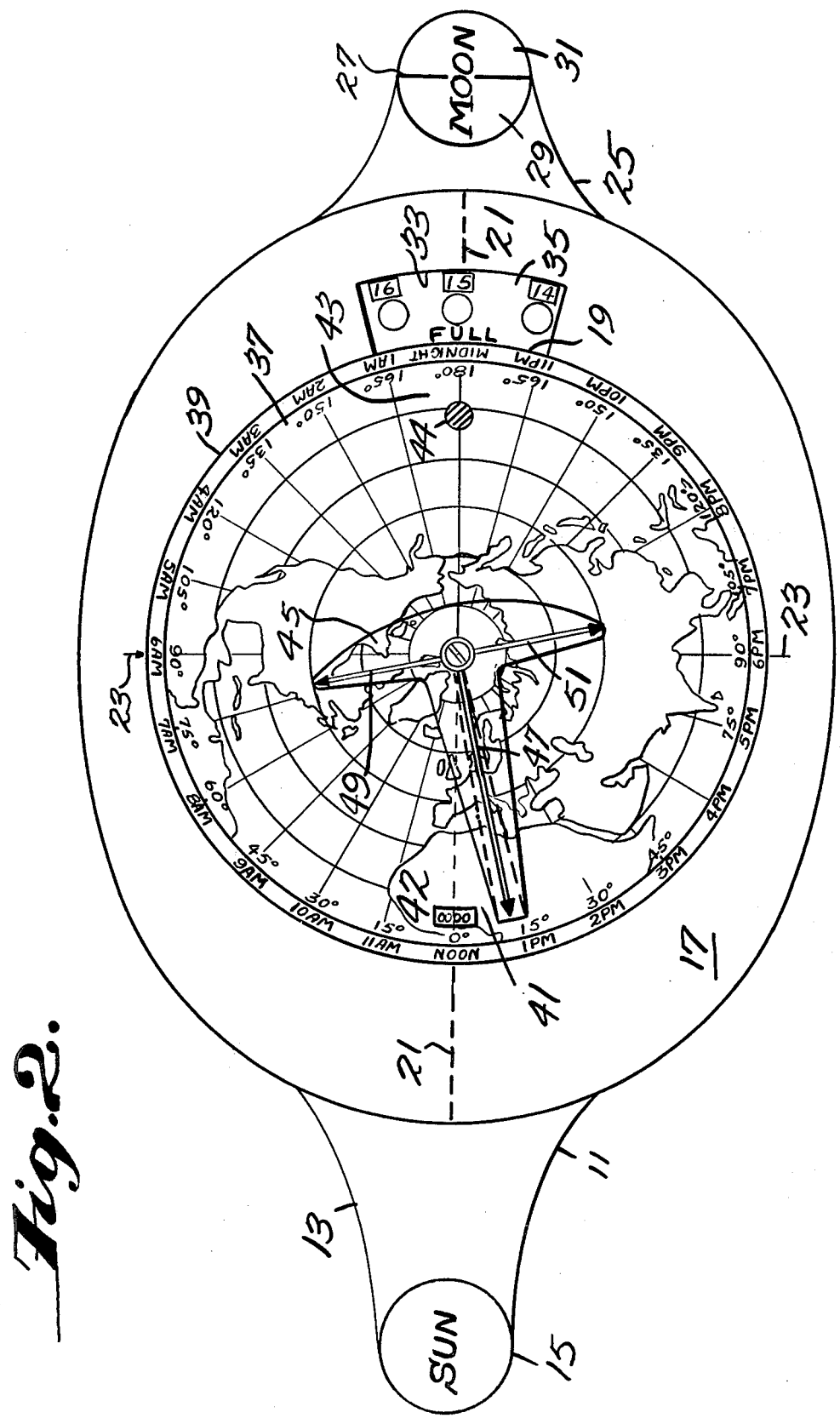
FIG. 2 is a plan view of the planetarium educational device of the present invention showing the sun and moon on opposite sides of the earth.

Refer now to FIG. 2 which is a plan view of the educational device of the present invention. As illustrated, the surface 15 which depicts the sun is aligned on the opposite side of the disc 37 which depicts the earth from the moon 27. This condition will exist during the middle of each lunar month, assuming that the beginning of each lunar month is defined by the alignment of the moon and sun on the same side of the earth 37. With the moon and sun in this alignment it can be seen that according to the Equilibrium Theory high tide will occur in a general area of 12:00 P.M. and 12:00 A.M. In addition, low tides will occur in the general time of 6:00 A.M. and 6:00 P.M. Thus, as the earth disc 37 is rotated, by simply viewing the shape of the elliptical disc 17 and the time indicated on the time plate 39, one can see generally how and when the high and low tides change at any location on the earth. Further, by viewing the moon phase plate 35, one can tell what type of moon, i.e. full moon, half moon, etc., and what day of the lunar month exists. This is called the "age" of the moon. Further, as aforementioned, rotation of the earth plate 37 and, more specifically, the International Date Line 43 with respect to base plate 11 and hence the sun 15 provides an indication of time changes due to the rotation of the earth. In the position illustrated, the International Date Line is aligned with mignight and is hence set to sweep in a new day. As the plate 37 is rotated counterclockwise, increasing portions of the earth are swept into the new day as each portion of the earth passes the midnight line. Further, it can be seen that those positions of the earth which are to the right of an imaginary line extending through 6:00 P.M. and 6:00 A.M. will be in nighttime while that portion of the earth to the left of the imaginary line extending through 6:00 A.M. and 6:00 P.M. will be in daylight, depending of course on the latitutde, and time of year. By selecting a point on the map, such as, for example, Washington, D.C. which is approximately on the 75° meridian west and rotating the earth disc 37 360°, one can readily observe the passing of the selected point, i.e., Washington, D.C., from nighttime into daylight and from a previous day into a new day as it sweeps past mightnight. Finally, one can readily appreciate not only the relative position of the sun with respect to the fixed point as it rotates in the daylight hours but also can appreciate the relative position of the moon as the point rotates through the nighttime hours.

Figure 3:
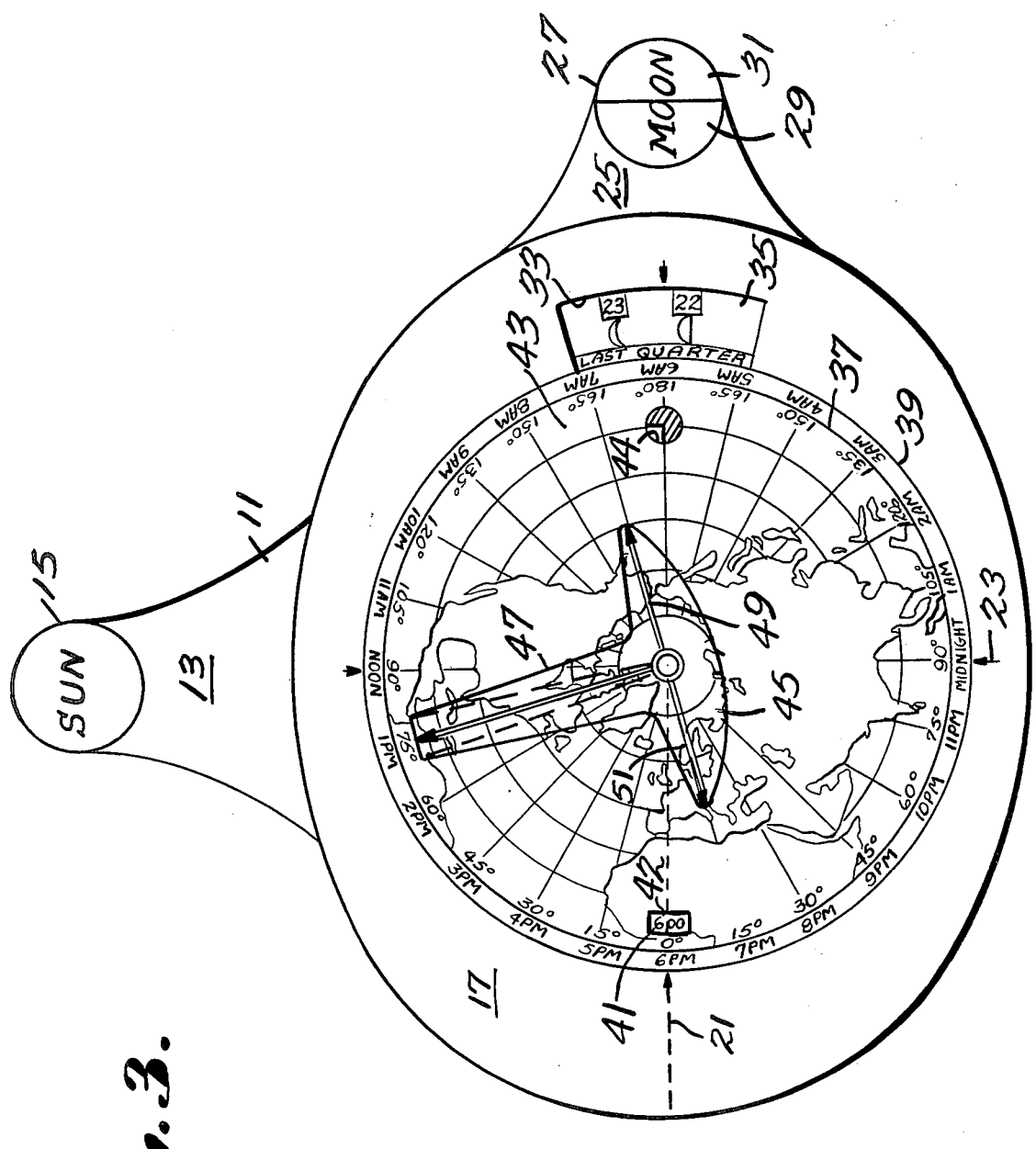
FIG. 3 is a plan view of the planetarium educational device of the present invention showing the sun and moon orthogonally disposed with respect to the earth.

Refer now to FIG. 3 which is a plan view of the educational device of the present invention wherein the moon is rotated 90° with respect to the sun. As illustrated, the bright surface 29 of the moon faces the sun 15 while the dark side 31 thereof faces away from the sun. Viewed from the earth, only about ¼ of the surface area of the moon is visible in this position. This is illustrated more specifically by the moon phase plate 35 as viewed through the opening 33 in the elliptical plate 17. Thus, in the twenty-second day of the lunar month, there exists a quarter moon. As the moon continues to rotate about the earth toward alignment with the sun, a progressively smaller portion of the surface area of the moon reflects light towards the earth as best illustrated by observing the shape of the light-reflecting portion of the moon on the moon phase plate 35 in the twenty-third lunar day.

It can also be seen that the general time in which high and low tides occur has been changed from that illustrated in FIG. 2 so that now a high tide generally exists around 6:00 A.M. and 6:00 P.M. rather than at 12:00 A.M. and 12:00 P.M. The reason for this is that the two tidal bulges are in large part caused by the gravitational attraction between the earth and pull of gravity of the moon and hence the tides tend to follow the rotation of the moon with respect to the earth. The other features of the invention, for example, the illustration of time and motion concepts provided by the rotation of the earth plate 37 with respect to the support plate 11 operate in the manner as disclosed in the discussion with respect to FIGS. 1 and 2.

Figure 4:
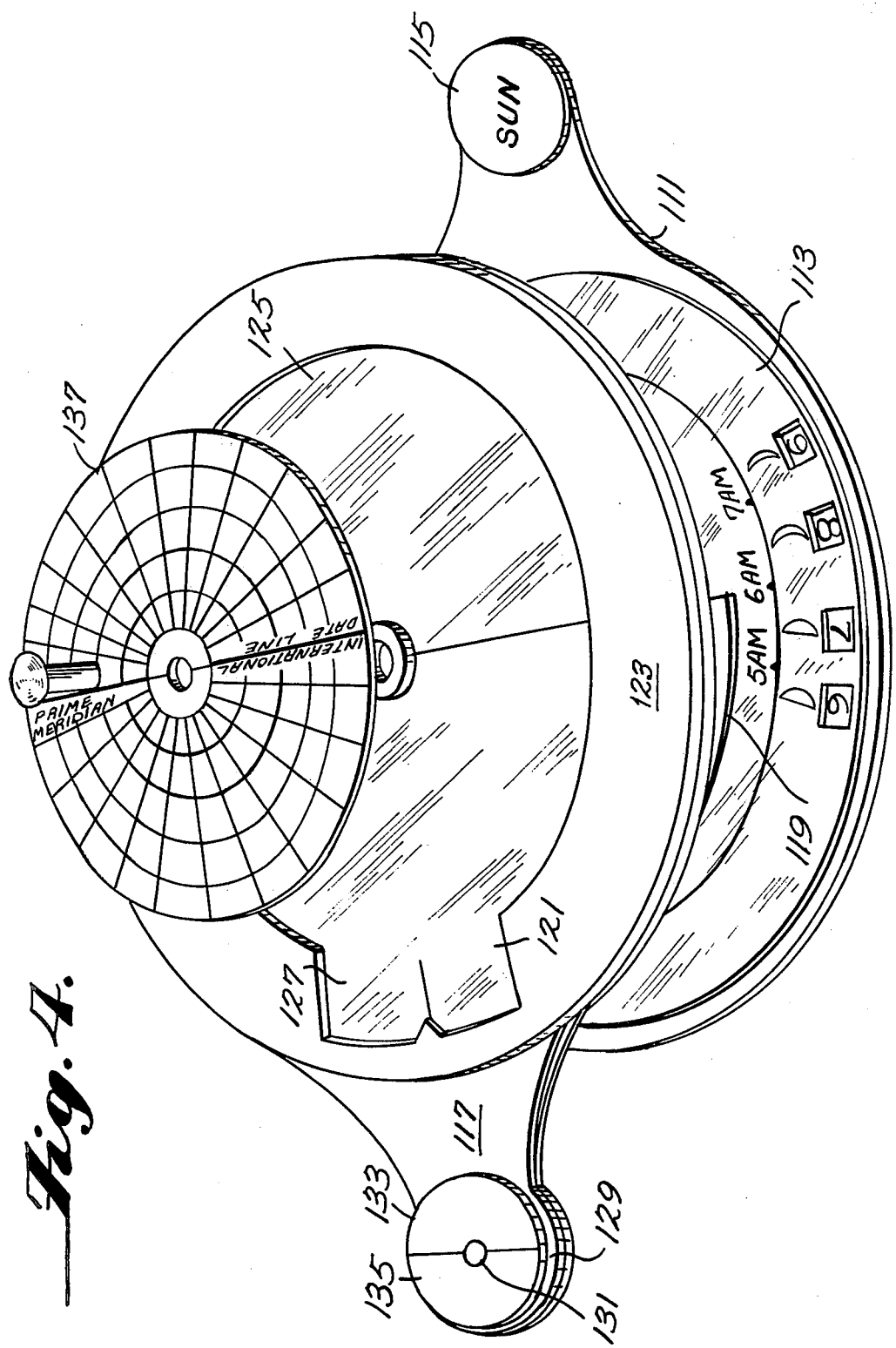
FIG. 4 shows an exploded perspective view of an alternate embodiment of the present invention.

Refer now to FIG. 4 where there is an exploded perspective view of an alternate embodiment of the present invention. In this embodiment, there is disclosed a base plate 111 having extending outwardly therefrom at one end a raised portion 115 which corresponds to the sun. A time and moon phase plate 113 is fixedly secured to the support plate 111 as illustrated. The time portion of the plate 113 corresponds to the time plate 39 in the first embodiment while the moon phase portion of the plate 113 corresponds to the moon phase scale 37 of the first embodiment. Also forming part of the plate 113 is a darkened portion 119 which is on the portion of the plate 113 facing away from the sun 115. The darkened portion is in the form of a half circle with the line extending from the time 6:00 P.M. defining the edge of the darkened portion 119 facing the sun 115. This darkened portion corresponds to nighttime. Positioned over the plates 111 and 113 is an ellpitical plate 117. The elliptical plate 117 is formed of a transparent plate 121 which is generally elliptical in shape with a second elliptically-shaped opaque plate 123 positioned thereover. Plate 123 has a hole 125 formed in the center thereof through which one can see through the transparent plate 121 to the time and moon phase plate 113. An opening 127 is formed in a portion of the inner periphery of the plate 123 which extends outwardly far enough to permit observation of the moon phases and day of the lunar month on the plate 113. Extending outwardly from the elliptical plate 117 is a support portion 129 on which is rotatably supported a circular disc 131 which corresponds to the moon. As illustrated, the moon is divided into two portions, the light portion 133 and the dark portion 135. The light portion 133 always faces the sun and, accordingly, rotates with respect to the earth as it passes about the earth during the lunar months. The elliptically-shaped plate is preferably colored blue to represent the oceans of the earth with a major axis corresponding to the high tides and the minor axis corresponding to the low tides. Thus, the general positions of the tides with respect to the moon and earth can be readily seen and understood. Rotatably secured with respect to both the plate 111 and the elliptical plate 117 is a circular earth plate 137 which preferably is transparent. Formed on the earth plate 137 is a map of either the northern or southern hemisphere. Formed on the map are a plurality of longitudinal and latitudinal lines, with the longitudinal lines including a Prime Meridian line and a line which represents the International Date Line. Plate 137 rotates both with respect to plated 111 and 117 and, accordingly, is rotatable with respect to the moon 131 and the sun 115.

In use, relative rotation of the earth plate 137 with respect to the sun and the moon and relative rotation of the moon with respect to the sun and earth illustrates the time and motion concepts mentioned hereinabove with respect to the solar system. The advantage of this embodiment of the invention is that by using a transparent earth plate 137 and a transparent elliptical plate 121, one can readily view the darkened portion 119 as a background to the earth plate 137 to determine what portions of the earth at any given position of the plate 137 are in lightness or in darkness.

Figure 5:
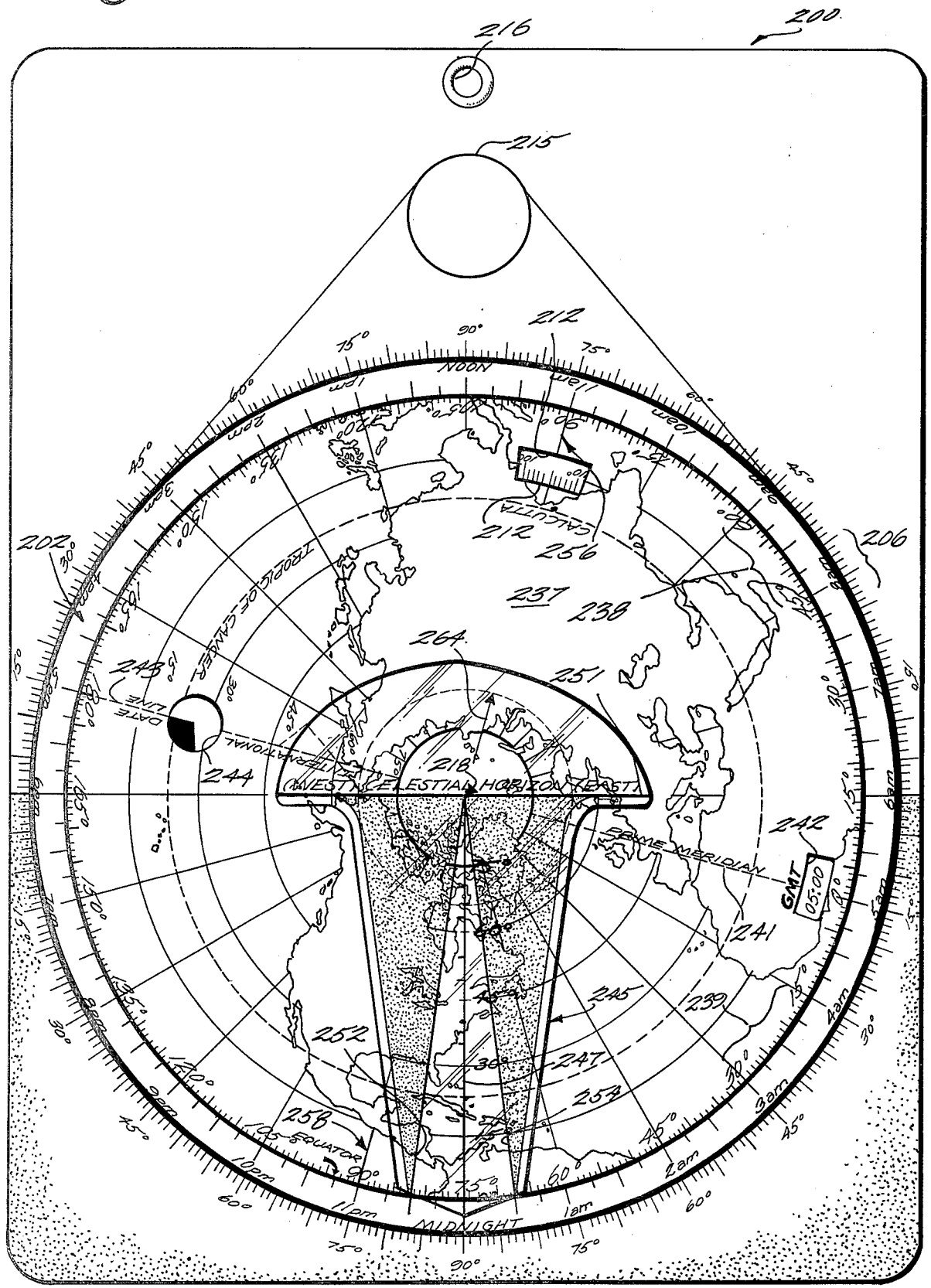
FIG. 5 is a top plan view of another embodiment of the educational planetarium device of the present invention.

Turning now to FIGS. 5-9, another illustrative embodiment of the present invention is shown which uses only the two top members of the first embodiment. As shown in FIG. 5, this planetarium apparatus is comprised of a primary board or support plate 200 having a circular portion thereon generally indicated at 202 which corresponds substantially to time plate 39 of the first embodiment. Primary board 200 includes a darkened circle 215 representing the sun and an opening 216 at the top of board 200 which is centrally located between the sides of board 200 and used to hang and properly position the support plate in a vertical plane as will be more fully discussed and described hereinafter. A second board in the form of a circular disc 237 corresponds substantially to the disc 37 of the first embodiment and is rotatably mounted on support plate 200 by rivet 218. The diameter of disc 237 is smaller than the diameter of circular portion 202 so that a portion of the latter is visible beyond the periphery of disc 237. The upper half of board 200 is light in color and generally represents the area of the earth reached by the sun's rays while the lower half is dark generally representing nighttime conditions.

This secondary board or disc 237 corresponds to the earth and contains a plurality of groups of indicia thereon including a map depicting either the northern or southern hemisphere together with the various latitude (parallels) and longitude (meridians) lines. As was the case with the first embodiment, longitude lines are separated by 15 degree intervals and referenced from or have a zero degree position on the first or Prime Meridian illustrated by numeral 241. The International Date Line is the meridian located directly opposite or 180° from the Prime Meridian and is indicated by numeral 243. The scale from 0° to 180° east is shown by numeral 238 while the scale from 0° to 180° west is indicated by numeral 239. A viewing window 242 extending through disc 237 to board 200 is provided on the Prime Meridian and is again designated as the GMT (Greenwich Meridian Time) window whereas the circular opening 244 in disc 237 is provided on the International Date Line and can also be called the IDL (International Date Line) window.

With reference to FIGS. 5 and 6, the primary board 200 includes a plurality of separate groups of indicia including an hour scale 204 located in the area of circular portion 202 extending beyond the periphery of disc 237. As was the case with the first embodiment, 12:00 P.M., i.e. noon, is directly adjacent the sun 215 while 12:00 A.M., midnight, is 180° from the noon position on the opposite side of the world away from the sun. Also, the designation of 6:00 A.M. which at the equinox corresponds to daybreak, and 6:00 P.M. which at the equinox corresponds to the end of the daylight period, are positioned 90° from both the 12 P.M. and 12 A.M. positions. Thus, a line connecting noon and midnight forms the central vertical axis 221 of support plate 200. The center of opening 216 must be in a dead center position between the sides of support plate 200 and is, therefore, positioned on vertical axis 221. The line connecting the 6:00 A.M. and 6:00 P.M. positions form the central horizontal axis 222 which is orthogonal with respect to vertical axis 221. Thus, if support plate 200 was allowed to hang freely from a pin or rod extending through support opening 216 as in the case of an astrolabe, the central horizontal axis 222 would be horizontal with the ground.

Still referring to FIG. 6, another group of indicia comprises four 0°-90° scales 206 positioned on circular portion 202 exteriorly of the hour scale referred to above. Each of the scales begin at a 0° position along the horizontal axis with one pair of scales beginning at the 6:00 A.M. position and extending away from one another around the periphery of circular portion 202 one terminating 90° away on the vertical axis or at the noon position the other termination 90° in the opposite direction on the vertical axis or at the midnight position. The other pair of 0°-90° scales both begin at the horizontal axis at the 6:00 P.M. position and each likewise terminates 90° away from that point in opposite directions on the vertical axis. These scales are preferably separated into one degree intervals with every 15° being set forth numerically and lying directly on one of the time meridians.

A transparent cursor 245, as shown in FIG. 10, rotatably mounted on support plate 200 by rivet 218 is provided with a local meridian line 247 and a latitude scale broken down into 5° increments to aid in locating a specific latitude. Cursor 245 is also provided with a western celestial horizon line 249 and an eastern celestial horizon line 251 which are orthogonal with the local meridian line 247. Further, lines 252 and 254, each angled 7.5° from the local meridian line 247, also appear on the transparent cursor and together serve to generally defined a time zone therebetween, It should be understood, however, that lines 252 and 254 can only approximate exact time zones around the world since overland boundaries of time zones are somewhat irregular and follow either political or convenience boundaries. Further, the cursor 245 could be shaded or colored leaving that area between lines 252 and 254 clear so that time zones appear in that clear area.

In this regard, across the United States the Eastern Standard Time zone is centered about the 75° west longitude line whereas Central Standard Time is centered about the 90° west longitude line, Mountain Standard Time on the 105° west longitude line and Pacific Standard Time on 120° west longitude line. Thus, for example, looking at FIG. 5, with the central meridian line 247 placed over the 75th west longitude, lines 252 and 254 show the approximate boundaries of the Eastern Standard Time zone and all locations on the map within such boundaries will be at 12:00 A.M. time. It should also be noted that a time of 05:00 will show in the GMT window 242 corresponding to Greenwich mean time.

Turning again to FIG. 6, a Greenwich mean time (GMT) scale 208 is located inwardly of time scale 204. The GMT scale 208 begins with 00:00 hours adjacent the midnight position and in 15° intervals hourly around portion 202 for 23 separate hourly indications. This scale is positioned so that the individual hourly indicia are visible through GMT window 242 on disc 237. Located inwardly of the GMT scale 208 is an azimuth scale 210 having its zero position located on the horizontal axis 222 and on the 6:00 P.M. side of circular portion 202. As shown, azimuth scale 210 extends for 360° about circular portion 202. An azimuth scale window 212 is located within disc 237 and centered on the 90th east longitude line below Calcutta and window 212 is aligned with azimuth scale 210 so that as disc 237 is rotated with respect to support plate 200 the azimuth scale 210 can be read therein.

With reference still to FIG. 6, a plurality of circles 214 are positioned in a circular pattern inwardly of azimuth scale 210 to show the two days which exist simultaneously. Each such circle lies directly adjacent one of the hour scale designations and except for the circle adjacent the midnight position each of the other circles 214 are divided into light and dark areas representing, respectively, portions of the northern hemisphere appearing on disc 237 which are being swept into the new day and the portions of the hemisphere still in the old day. The completely black circle adjacent the midnight position indicates that at least for one instant the entire hemisphere would be in the same day. By turning disc 237 so that the International Date Line is adjacent 1:00 A.M., corresponding to the earth's turning of another 15°, a small white area appears on the otherwise dark circle visible through window 244. This white area corresponds to the portion of the northern hemisphere lying between the International Date Line at its 1:00 A.M. position and its former midnight position. As the earth, represented by disc 237, continues to rotate counterclockwise (west to east) the white area will be seen to grow ever larger by 15° increments per hour while the dark portion, corresponding to the old day, simultaneously grows smaller at a like rate. Thus, the light portion will constantly be one day ahead of the darker portion of the circles appearing within window 244.

Returning for a moment to FIG. 5, punched holes 256 and 258 are provided on the periphery of disc 237 so as to be opposite one another and also on the 90th meridian line. As shown in the cross section of this embodiment in FIG. 7, holes 256 and 258 respectively are provided to support pins 260 and 262. The pins 260 and 262 can be provided by using inverted thumb tacks, as shown in phantom in FIG. 7. Additionally, all that is essential is to have a member positioned where pins 260 and 262 are located across which one can sight and which will cast a shadow or a narrow beam of light as might be provided by a slit in an opaque member. Thus, a built-in fold-out arm arrangement could also be employed instead of thumb tacks having either a narrow arm or a slit. An arrow 264 is also provided on circular disc 237 and is positioned on the east 90th meridian and as shown adjacent rivet 218.

With pins 260 and 262 in place within holes 256 and 258, it is possible to use this apparatus to measure azimuths, to determine the elevation of celestial bodies, such as the north star or the sun, and determine one's latitude position. Likewise, if one's latitude position is known it is possible to use this device to locate celestial bodies at known elevations, or measure the angle between the horizon and a celestial object. In each of these uses the present invention provides a way to demonstrate or teach navigational concepts, the relationship between the earth and other celestial objects as well as other geographical aspects of space.

The term "azimuth" refers to the angle from a north point always measured from geographic north rather than magnetic north eastward to the intersection with the vertical circle of a celestial object. To find geographic north, one can use a compass to find magnetic north and then a known correction factor can be added to find the true geographic north. The term "vertical circles" refers to circles drawn through the zenith and nadir positions of that celestial object (i.e. the positions or points on the celestial sphere directly above and beneath the observer) which circles are perpendicular to the celestial horizon. Distances along and between such vertical circles are, of course, measured in degrees. It is known that azimuth measurements range between 0° to 360° with the north point having a 0° azimuth position while the due east, south and west points having azimuth positions of 90°, 180° and 270° respectively. To measure an azimuth it is only necessary to find the north point by using a compass. Then laying support plate 200 flat and aligning the 0° position of the azimuth scale and pin 260 with that north point, disc 237 can then be rotated simulating movement along the celestial horizon until pin 260 and 262 align with the vertical circle of the celestial body. The degree representation of the azimuth can be read directly through azimuth window 212. Thus, the aximuth of a sighted celestial object can be found or by plotting a known azimuth, the vertical circle for a celestial object can be easily located. Further, the sun's azimuth or the moon's if it is bright can also be taken with the board flat. After finding geographic north, the shadow of the sun or moon formed with pin 260 could then be aligned with arrow 264 with the azimuth then being directly read through window 212.

This aperture can also be used to measure the altitude or elevation of celestial bodies. When measuring elevation, it should be remembered that the line connecting 6:00 A.M. and 6:00 P.M. or the horizontal axis 222 is considered as the horizon line. Azimuth scale 210 has its zero position on the horizontal axis 222 adjacent the 6:00 P.M. position indicating that at the horizon the elevation of a celestial object is zero. If the device were freely suspended from support opening 216 so that horizontal axis 222 is parallel with the ground it is possible to thereafter sight along pins 260 and 262 either directly or through a straw placed thereacross until the pins become aligned with a celestial object whose elevation is being determined. For example, if the elevation of the north star were being measured one would freely suspend the support plate 200 from hole 216 and thereafter sight along pins 260 and 262 until they aligned on the north star. Thereafter, exact elevation of the north star could be read through window 212. It is important in making the operation of this device as useful as possible that window 212 be positioned on the 90° east longitude line as opposed to being located on the opposite side (i.e. west 90° longitude).

If it is desired to determine the elevation of the sun, it is important not to look directly at the sun and therefore rather than making a direct visual sighting across pins 260 and 262 the following procedure is used. The support plate 200 is again freely suspended from support opening 216. Then standing sideways to the sun so that the sun is approximately 90° to the left a shadow will be formed by sunlight falling across pin 260 as represented by the dotted line 270 in FIG. 8. The circular disc 237 would then be rotated until that shadow aligned with arrow 264 which as indicated before, is located on the east 90° longitude line. With the sun's shadow in this position the exact elevation can be read on the azimuth scale 210 appearing in window 212. If the moon were bright, it might also be possible determine the moon's elevation by using the shadow created by the moon and pin 260.

It is well known that the declination of a celestial object refers to the angular distance of that object from the celestial equator or in the present invention meridian 241. Declination is commonly measured northwardly and southwardly from the celestial equator and specifically in a positive manner when measuring northward and in a negative manner when measuring southward. Traditionally the sun passes through an arc from +23° north declination, usually reached on June 23rd during the summer to −23° south declination on December 21st. These two periods are usually referred to, respectively, as the summer and winter solstice. The fall and spring equinox occur on September 22nd and March 21st respectively and constitute that point at which the declination angle is zero or where the arc crosses the celestial equator. The declination for the sun on a particular day can be determined for example by reference to publications such as *The Nautical Almanac*, for the year 1978, published in Washington, D.C. by the Department of the Navy, Nautical Almanac Office, U.S. Naval Observatory. Using the zero point in the longitude scales 238 and 239 as the zero point for declination settings, if the declination is −5° south declination, as shown in FIG. 8, it is possible to set line 247 of cursor 245 at a −5° reading which is 5° below the Prime Meridian line or 5° on scale 239. With line 247 set in that manner, the elevation of the sun can then be found as described before by aligning the shadow cast by pin 260, represented by dotted line 270, with arrow 264. Thus, as shown in FIG. 8, after setting the declination angle of −5° south declination and with the sun's transit elevation at approximately 45°, as shown in window 212, the latitude of about 40° where the reading was taken can be read on scale 206 located between 6:00 A.M. and noon.

Figure 9:
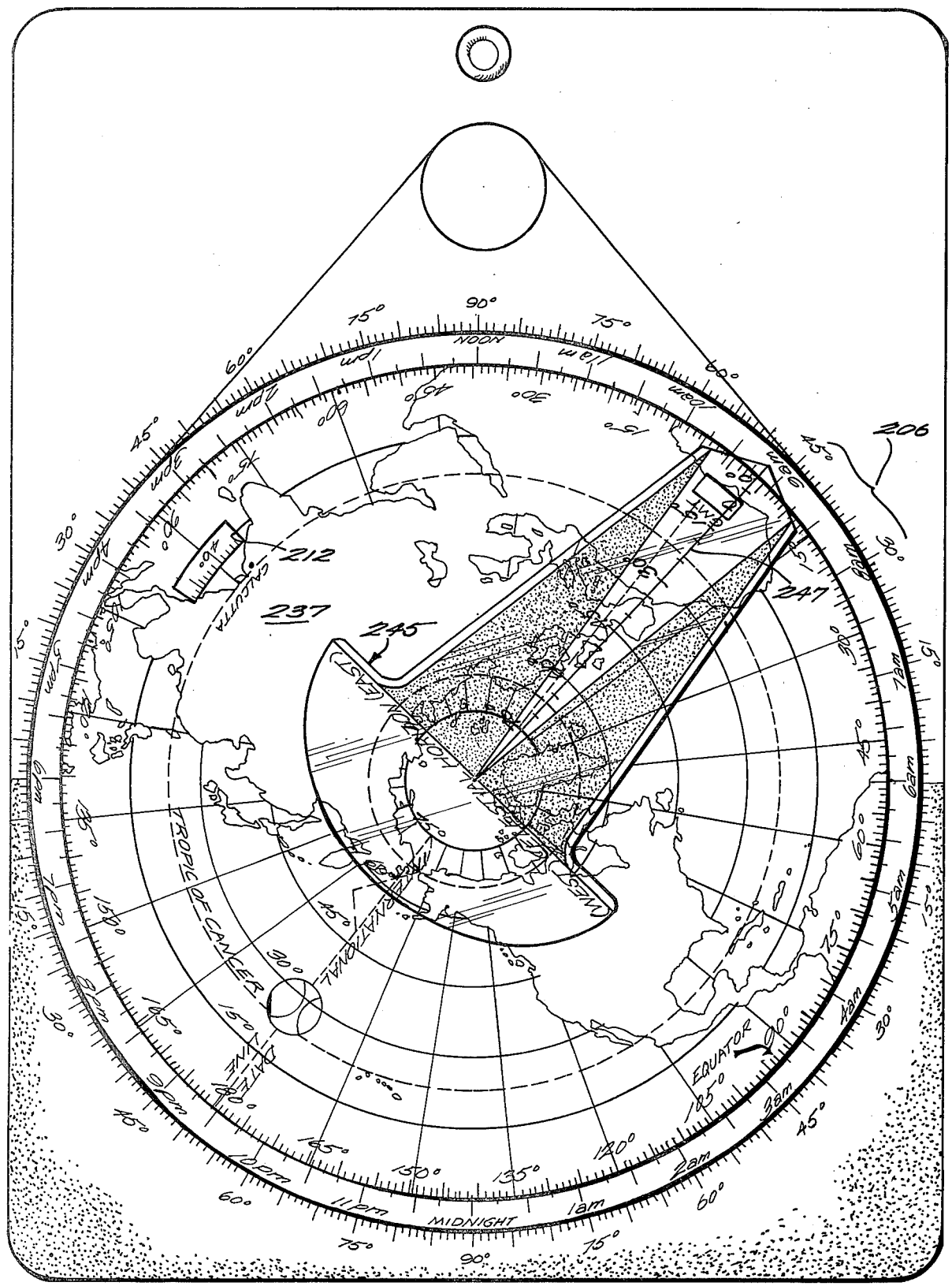
FIG. 9 is a top plan view of the embodiment shown in FIG. 5 showing another exemplary mode of operation.

Turning now to FIG. 9 if the latitude is known as well as the sun's declination angle for a particular day it is possible to determine how high the sun will rise off the horizon that day by setting the central line 247 of cursor 245 at the known declination and setting the known latitude on the 90°—90° line on disc 237 within window 212. The maximum elevation for that day could then be read along the 0°—90° scale 206 appearing between the 6:00 A.M. to noon positions on circular portion 202. As shown in FIG. 9, for a latitude setting of about 39° and a −5° south declination, the elevation would be approximately 47° above the horizon established by an imaginary line extending between 6:00 A.M. and 6:00 P.M.

For a given time of day and at a given location, i.e. where you are from a latitude and longitude standpoint, celestial objects whose azimuth and altitude coordinates are known can be located. From standard reference tables it is possible to determine the azimuth and altitude or elevation coordinates for a celestial object. Thus, with these coordinates, the azimuth could be found by finding geographic north and then setting the zero point of the azimuth scale at that north point the proper azimuth can be found by rotating disc 237 until the given azimuth reading appears in window 212. Thereafter, a reference point could be found by sighting across pins 260 and 262. Then, hanging the device in a vertical plane, aligned with the azimuth reference point, and having set the elevation scales at the known elevation coordinate, the celestial object can be located by again sighting across pins 260 and 262.

It can be seen that by this invention, there is provided a relatively thin, compact teaching device for illustrating the concepts of time and motion relating to the solar system. Such a device can be provided in books or can be easily carried with school materials and stored, so that as a result thereof a relatively convenient educational device is provided for illustrating the complex interrelationships of the sun, moon and earth in the solar system. It should be understood that while the present invention has been disclosed in connection with preferred embodiments thereof, there may be various alternate embodiments which fall within the sphere and scope of the invention as defined by the appended claims.

What I claim is:

1. In an educational planetarium apparatus including a primary board acting as a support for the apparatus and having a plurality of groups of primary indicia thereon, a secondary board dimensionally smaller than said primary board, said secondary board rotatably mounted on said primary board and having a plurality of groups of secondary indicia thereon, said primary and secondary boards each having a first group of indicia which cooperatively show worldwide time zones, said primary board including a second group of indicia comprising a plurality of markings each aligned with said first group of indicia on said first board, said plurality of markings on said primary board having first and second colored areas depicting respectively the particular day existing in the world, said first group of indicia on said secondary board including a representation of the International Date Line, said second board including means defining a first opening positioned on the International Date Line for successively showing each one of said second group of indicia on said first board as said second board is rotated.

2. An educational planetarium apparatus as in claim 1 wherein said primary board, divided by an imaginary vertical and horizontal axis, includes a third group of indicia comprising a plurality of marks arranged in a circular pattern around the point at which the axis cross and located inbetween said first and second groups of indicia, each of said marks in said third group corresponding to degrees spaced 1 degree apart beginning at a zero degree mark on the horizontal centerline on the left side of the vertical axis.

3. An educational planetarium apparatus as in claim 2 wherein said primary board further includes at least one fifth group of indicia spaced outwardly from said first group on said primary board and comprising a plurality of marks arranged in a circular pattern around the point at which the axes cross, each of said marks in said fifth group corresponding to degrees spaced 1 degree apart and beginning at a zero degree mark on the horizontal axis on the right hand side of the vertical axis and terminating at a ninety degree mark.

4. An educational planetarium apparatus as in claim 2 wherein said primary board further includes a fourth group of indicia comprising a plurality of marks arranged in a circular pattern around the vertical and horizontal axis crossing point, each of said marks in said fourth group being spaced 15 degrees apart wherein one of the marks in said first group of indicia on said primary board corresponding to midnight with the zero point of said fourth group being aligned with the midnight position on said first group.

5. An educational planetarium apparatus as in claim 4 wherein said second board includes means defining second and third openings for simultaneously but respectively showing one of the marks in the third and fourth groups of indicia on said primary board, said second and third openings being positioned respectively 90 and 180 degrees west of the International Date Line.

6. An educational planetarium apparatus as in claim 4 wherein said primary board includes a fifth group of indicia comprised of a plurality of marks spaced one degree apart and arranged in a circular pattern, said fifth group including at least three zero to ninety degree scales, one having a zero point on the right hand side of the horizontal axis and extending upwardly ninety degrees, the other two scales having a zero point on the left hand side of the horizontal axis and extending ninety degrees away from the zero point in both directions.

7. A device as in claim 6 wherein the fifth group of indicia is visible beyond the periphery of said second board.

8. An apparatus as in claim 1 further including a cursor rotatably mounted on top of said second plate, said cursor including means for defining approximate time zones on said second plate.

9. An apparatus as in claim 8 wherein said cursor is transparent.

10. Apparatus as in claim 9 wherein said cursor includes a visible centerline extending outwardly from the point the cursor is rotatably mounted to said apparatus to the periphery of the cursor and wherein said time zone defining means comprises an unshaded portion extending away from each side of said centerline in an area defined between lines angled 7.5 degrees away from the centerline beginning at the point the cursor is rotatably mounted to said apparatus.

11. An apparatus as in claim 10 wherein the centerline includes a latitude scale comprised of a plurality of marks spaced five degrees apart with a zero point beginning at a point aligned with the periphery of said second plate.

12. An apparatus as in claim 9 wherein said cursor includes a visible centerline extending outwardly from the point at which the cursor is rotatably mounted to said apparatus to the periphery of the cursor and a visible celestial horizontal line positioned orthogonally with the centerline at the mounting point of the cursor.

13. An educational device for plotting azimuths and altitudes of celestial objects comprising a primary board serving as a support for the apparatus, said primary board including a plurality of groups of indicia, a secondary board dimensionally smaller than said primary board and rotatably mounted thereon, that portion of said primary board having said plurality of indicia groups being divided into right and left and top and bottom portions by vertical and horizontal axes respectively, said primary board having at least a first group of indicia for indicating azimuths and altitudes comprising a plurality of marks arranged in a circular pattern around the crossover point of the centerlines each of said marks being spaced on degree apart and having a zero point on the horizontal axis on the left side of said primary board, said secondary board having indicator means for aligning with said first group of indicia on said primary board and sighting means aligned with said indicator means for use in locating the azimuth or altitudes of objects and for aligning said indicator means with said first group of indicia.

14. An educational device as recited in claim 13 wherein said first group of indicia comprises a 0° to 360° scale.

15. An educational device as recited in claim 13 wherein said first group of indicia on said primary board is located beneath said secondary board, and wherein said indicator means includes means defining an opening in said secondary board for exposing a portion of said first group therein as said secondary board is rotated.

16. A device as in claim 13 further including a cursor rotatably mounted above said secondary board, said cursor extending from the center of said secondary board at least to the periphery thereof.

17. A device as in claim 16 wherein said cursor is transparent and includes a visible centerline extending outwardly from the point at which the cursor is rotatably mounted to the device to the periphery of the cursor.

18. A device as in claim 17 wherein said primary board includes a second group of indicia, positioned beyond the periphery of said second plate, comprised of a plurality of marks spaced one degree apart and arranged in a circular pattern, said second group including at least three zero to ninety degree scales, one having a zero point on the horizontal axis to the right of the vertical axis and extending upwardly along the circular pattern ninety degrees to the vertical axis, the other two scales having a zero point on the horizontal axis to the left of the vertical axis and extending upwardly and downwardly along the circular pattern ninety degrees away from the zero point.

* * * * *